US006644674B2

United States Patent
Simard

(10) Patent No.: US 6,644,674 B2
(45) Date of Patent: Nov. 11, 2003

(54) SHOPPING CART WITH DEDICATED MULTI-COMPARTMENTS

(75) Inventor: Gilles Simard, LeGardeur (CA)

(73) Assignee: Cari-All, Inc., Montreal (CA)

( * ) Notice: Subject to any disclaimer, the term of this patent is extended or adjusted under 35 U.S.C. 154(b) by 31 days.

(21) Appl. No.: 10/074,761

(22) Filed: Feb. 12, 2002

(65) Prior Publication Data

US 2003/0151219 A1 Aug. 14, 2003

(51) Int. Cl.[7] .............................................. B62B 3/14
(52) U.S. Cl. .......................... 280/33.991; 280/33.992; 280/47.35
(58) Field of Search .................. 280/47.35, 33.991, 280/33.992, 33.993, 33.996, 79.2, 79.3, 35, 47.25, 47.34, 33.997

(56) References Cited

U.S. PATENT DOCUMENTS

| | | | | |
|---|---|---|---|---|
| 2,479,530 A | * | 8/1949 | Watson | 280/33.991 |
| 2,662,661 A | * | 12/1953 | Goldman | 220/486 |
| 3,353,836 A | * | 11/1967 | Davis | 280/33.997 |
| 3,534,973 A | * | 10/1970 | Elliott | 280/33.992 |
| 5,435,582 A | * | 7/1995 | Davidson | 280/33.992 |
| 5,507,507 A | * | 4/1996 | Davidson | 280/33.991 |
| 6,126,181 A | * | 10/2000 | Ondrasik | 280/33.991 |
| 6,354,612 B1 | * | 3/2002 | Adamson | 280/33.992 |
| 2001/0022436 A1 | * | 9/2001 | Simard | 280/33.991 |
| 2003/0042694 A1 | * | 3/2003 | Werner | 280/33.991 |

FOREIGN PATENT DOCUMENTS

JP 2-155868 * 6/1990 .............. B62B/3/00

* cited by examiner

Primary Examiner—Brian L. Johnson
Assistant Examiner—J. Allen Shriver
(74) Attorney, Agent, or Firm—Carter Schneldler&Monteity, P.A.

(57) ABSTRACT

A shopping cart with dedicated multi-compartments is described. There are five distinct compartments which are shallow and formed of wire mesh to provide visibility of the articles in the compartments whereby a person can quickly examine the articles placed in each of the compartments to ascertain their nature. Also, the size and location of the compartments provides for the placement and separation of different types of articles which either need to be separated from one another and permit lower support for the placement of heavy objects. The provision of such multi-compartments also prevents articles from being damaged or odor contaminated by other articles positioned in the same compartments. Casters are disposed on the outer periphery of the frame of the shopping cart, wherein the load in the multi-compartments remains between the casters to provide stability, and preventing tipping of the shopping cart.

10 Claims, 2 Drawing Sheets

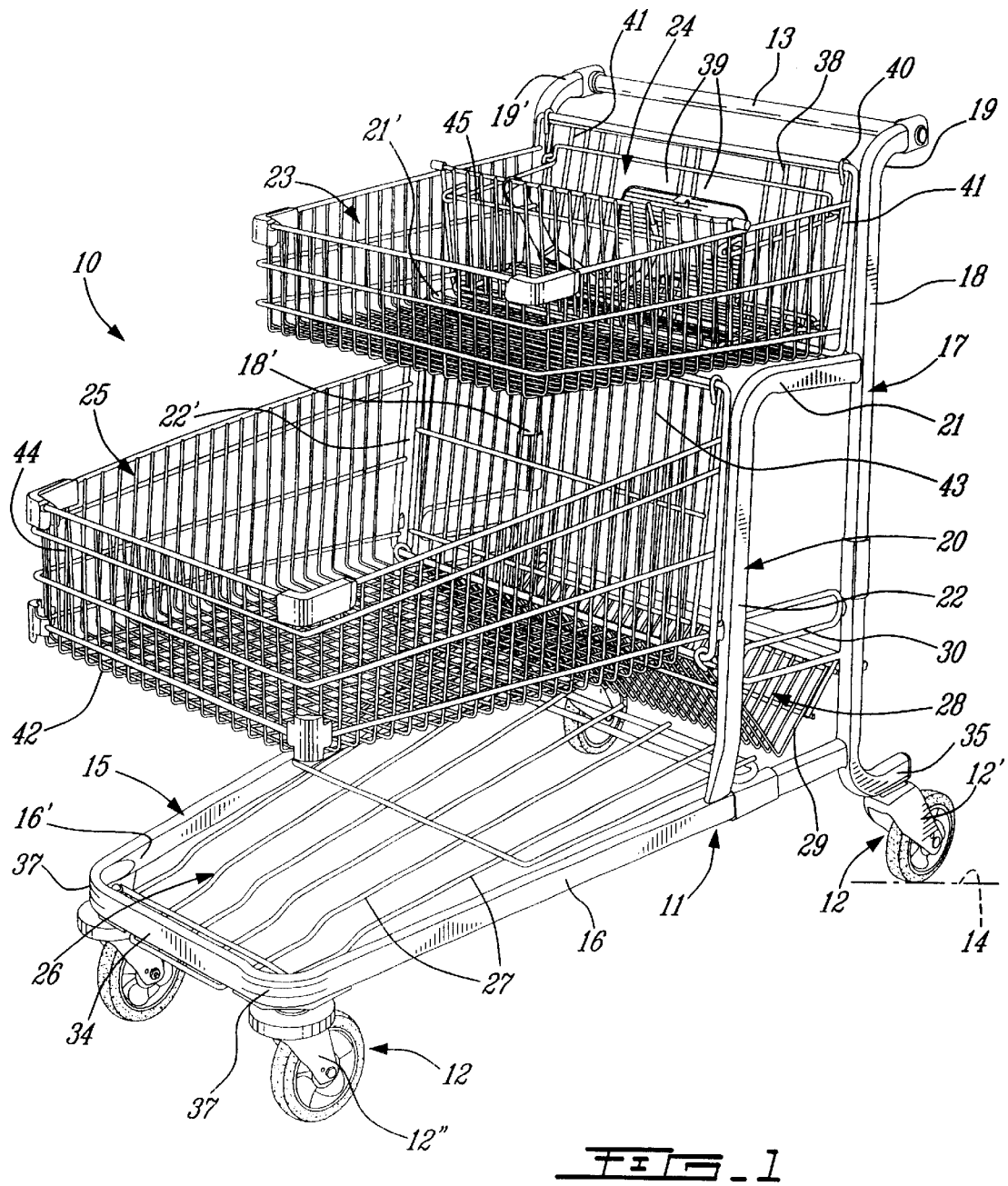
FIG_1

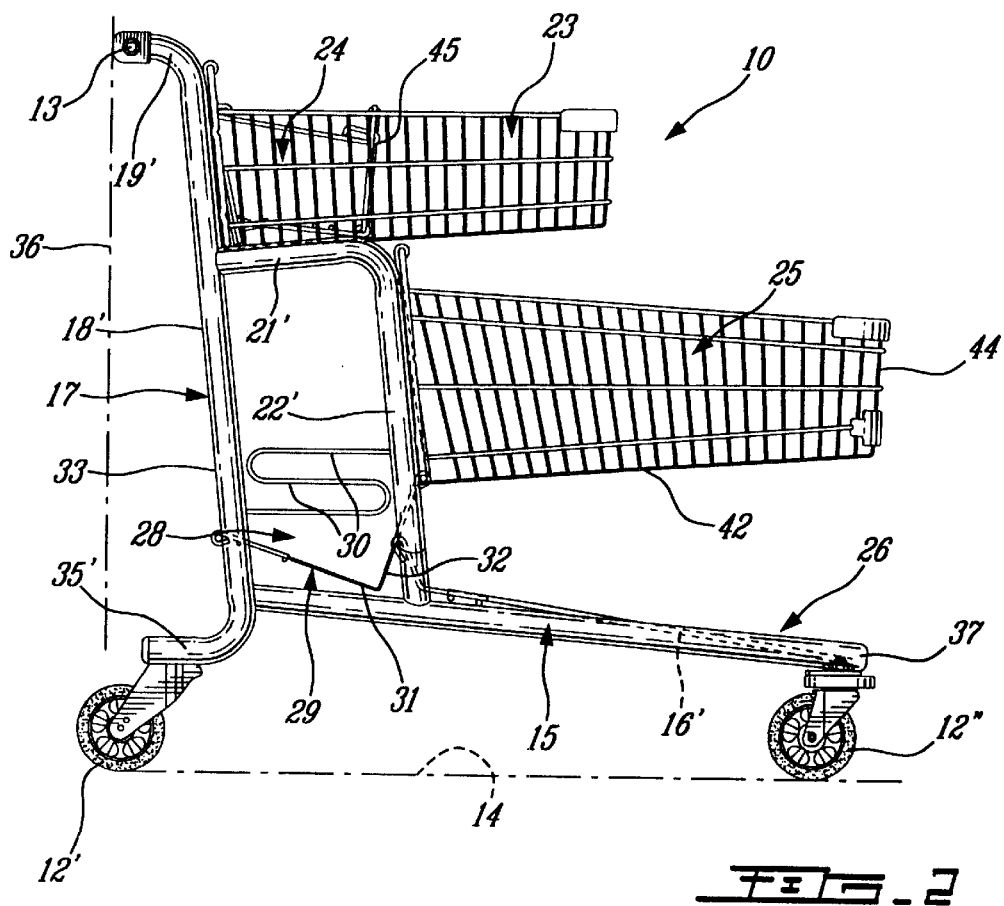
FIG_2
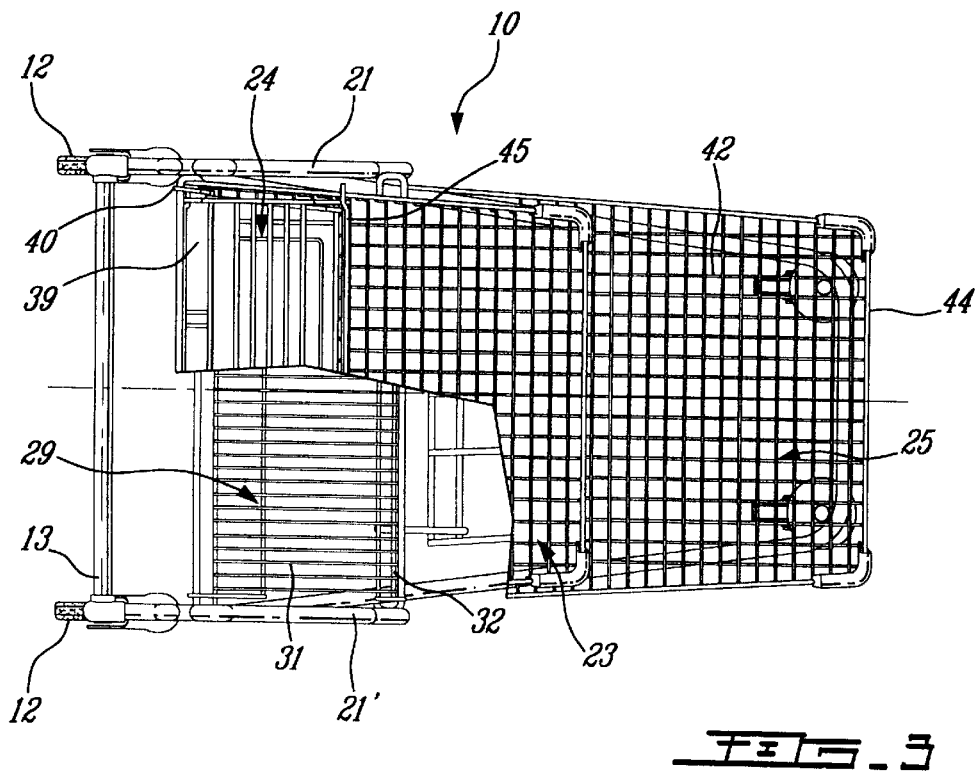
FIG_3

SHOPPING CART WITH DEDICATED MULTI-COMPARTMENTS

TECHNICAL FIELD

The present invention relates to a shopping cart with dedicated multi-compartments wherein to provide a variety of compartments which permit excellent visibility to articles disposed in the compartments and to separate perishable or damageable articles from heavy articles or odor contaminating articles, and permitting ease of placement of heavy articles in other compartments.

BACKGROUND ART

The shopping cart of the present invention is an improvement of the type of shopping cart as described in our co-pending application, Ser. No. 09/759,367, filed on Jan. 16, 2001, and entitled "Shopping Cart with Wheeled Support Base Preventing Tip Overs." The shopping cart as described therein has only two twin baskets, with the top basket having a baby seat compartment, and accordingly the top basket may be said to have two separate compartments. That patent application is more concerned with preventing tip-over whereby the baskets and their load are disposed substantially between the outer periphery of the casters. One disadvantage of such shopping carts is that the baskets have large load capacities and many of the products placed in the baskets are hidden by other products placed thereover and thereabout. Therefore, it is difficult to ascertain whether a certain product has been purchased and hidden from view in one of the baskets without having to move the products around in these baskets. This is time-consuming, provides traffic jam in the aisles of merchandising stores, and also can cause damage to certain fragile articles such as eggs, and still further can cause contamination of some foodstuff by odors given from certain other products such as powdered soap boxes, which sometimes may have a film of soap on the outer surface thereof which is caused during bulk transportation of such products.

A main disadvantage is that, because the baskets are so large, foodstuff or other type articles are buried and can be damaged, and, seeing that they are not visible to the user person, this may only be discovered at the checkout counter. This often also results in the same article being placed in the basket twice, and this again causes delays at the checkout counters, or else the person purchases two of the same article.

SUMMARY OF INVENTION

It is a feature of the present invention to provide a shopping cart with dedicated multi-compartments which substantially overcomes the above-mentioned disadvantages of the prior art.

According to the above feature, from a broad aspect, the present invention provides a shopping cart with dedicated multi-compartments. The shopping cart comprises a tubular frame supported on casters. A handle is disposed rearwardly in an upper section of the frame for displacing the shopping cart on a surface. The frame has a base portion having at least spaced-apart side frame members extending in a common plane with respect to a floor surface. The frame also has a rear portion upwardly extending from the spaced-apart side frame members. The rear portion is defined by a rear tubular vertical frame member extending upwards from a rear section of an associated one of the spaced-apart side frame members. The handle is connected between a top free end of the rear tubular vertical frame members. A structural stepped frame portion is disposed forwardly of each rear tubular vertical frame member and defined by a pair of L-shaped tubular members, each secured between a respective one of the spaced-apart side frame members and the pair of rear tubular vertical frame members. The L-shaped tubular members have a top horizontal leg section and a depending vertical leg section. A free end of the horizontal leg section is secured to an associated one of the pair of rear tubular vertical frame members and spaced from the top free end thereof. The vertical leg section is secured at a lower end to one of the side frame members. A shallow top basket compartment is secured across the horizontal leg sections and projects forwardly thereof, and is adapted to receive light fragile merchandise therein. The top basket compartment has a rear smaller compartment adapted to receive small fragile articles separated from the shallow top basket. A large shallow intermediate basket compartment is secured to the vertical leg sections and is spaced under the shallow top basket compartment and has a major section thereof projecting forwardly of the shallow top basket compartment, and is adapted to receive nonfragile articles therein. A support platform is formed across the spaced-apart frame members of the base portion of the frame and is accessible from under said large intermediate compartment, and is adapted to receive large heavy articles. A rear lower compartment is accessible rearwardly of the shopping cart and has a trough-like support shelf adapted to receive and retain articles not desirable to be close to foodstuff, to separate them therefrom.

BRIEF DESCRIPTION OF DRAWINGS

A preferred embodiment of the present invention will now be described with reference to the accompanying drawings in which:

FIG. 1 is a perspective view of the shopping cart of the present invention, having dedicated multi-compartments;

FIG. 2 is a side view of the shopping with dedicated multi-compartments; and

FIG. 3 is a top view, partly fragmented, of FIG. 2.

DESCRIPTION OF PREFERRED EMBODIMENTS

Referring now to the drawings, there is shown generally at 10 the shopping cart of the present invention, having dedicated multi-compartments. The shopping cart comprises a tubular frame generally shown at 11, which is supported on caster assemblies 12. A handle 13 is secured to the frame and disposed rearwardly in an upper section thereof for displacing the shopping cart 10 on a surface 14.

The frame 11 has a base portion 15, having spaced-apart side frame members 16 and 16' which extend in a common plane with respect to the plane of the floor surface 14. As more clearly shown in FIG. 2, the base portion 15 is slightly sloped upwards from the front end of the shopping cart to its rear end. The tubular frame 11 also has a rear portion 17 which extends upwardly from the spaced-apart side frame members 16 and 16', and is disposed at a rear portion thereof. The rear portion 17 is defined by rear tubular vertical frame members 18 and 18', each extending upwards of a rear section of an associated one of the spaced-apart side frame members 16 and 16'. The handle 13 is secured across a top free end 19 and 19' of the pair of rear tubular vertical frame members 18 and 18'. The rear frame portion 17 also comprises a structural step frame portion 20 disposed forwardly of each rear tubular vertical frame member 18 and 18', and shaped as an L-shaped tubular member secured between a respective one of the spaced-apart side frame members 16 and 16' and an associated one of the rear tubular vertical frame members. The L-shaped tubular members each define a top horizontal leg section 21 and 21' and a depending vertical leg section 22 and 22'. The free ends of the horizontal leg sections 21 and 21' are secured respectively to an associated one of the rear tubular vertical frame members 18 and 18' and spaced from the top free end thereof. The vertical sections are secured at a lower end to a respective one of the side frame members 16 and 161'. The tubular frame members are secured together by welds.

A shallow top basket compartment 23 is secured across and over the horizontal leg sections 21 and 21' and a top portion of the vertical frame members, and projects forwardly thereof. This shallow top basket 23 is adapted to receive light fragile merchandise therein. The shallow top basket compartment 23 also has a rear smaller compartment 24, which serves as a baby seat compartment and which is adapted to receive small fragile articles separated from the shallow basket.

A large intermediate basket compartment 25 is secured to the vertical leg sections 22 and 22' and spaced under the shallow top basket compartment 23, and has a major section thereof projecting forwardly of the shallow top basket compartment, providing ample access to receive therein non-fragile articles or much larger articles. This basket compartment is also of a shallow design. A support platform 26 is formed across the spaced-apart frame members 16 and 16' of the base portion and is accessible from under the large intermediate compartment 25, and it is adapted to receive large heavy articles such as cases of canned goods or beverages, etc., which are heavy to lift, and accordingly these articles are lifted only slightly off the floor and slid onto this support platform 26. The platform is formed by spaced-apart wire rods 27, as is common in the art.

A rear lower compartment 28 is also provided and is accessible rearwardly of the shopping cart, and has a trough-like support shelf 29 adapted to receive and retain articles not desirable to be close to foodstuff, such as soap powder boxes or liquid detergents, etc., which need to be separated from more delicate foodstuff such as butter or vegetables so as not to contaminate these with the odor of these detergent products or the powdered detergent film that may be present on the boxes.

As is better seen from FIGS. 1 and 2, the pair of rear tubular vertical frame members 18 and 18' and the vertical leg sections 22 and 22' of the L-shaped tubular members 20 are secured spaced apart in substantially parallel relationship. A side wall member 30 is secured between these tubular frame members 18 and 22 and 18' and 22', whereby to prevent goods placed on the trough-like support shelf 29 from falling out from the side of that compartment. As herein shown, the trough-like support shelf 29 is V-shaped in cross-section and defines a downwardly extending bottom wall 31 which depends inwardly from between the pair of rear tubular vertical frame members 18 and 18', and a forwardly sloped front wall 32 which is disposed at substantially right angles to the bottom wall 29, whereby articles are inclined forwardly on the trough-like support shelf and prevented from falling out from the rear open end 33 thereof.

Accordingly, it can be seen that the multi-compartments of the shopping cart 10 is constituted by the top basket compartment 23, the rear smaller compartment 24, the intermediate basket compartment 25, the support platform 26 and the rear lower compartment 28. All of these compartments are constructed of spaced-apart wire rods, such as those illustrated by reference numeral 27, whereby to provide visual access to merchandise in all of these multi-compartments. This is useful to a user person to determine if a certain product has been purchased, as often with these large shopping carts articles are concealed and damaged by other articles.

As seen more clearly in FIGS. 1 and 3, the spaced-apart side frame members 16 and 16' are angulated outwardly towards the rear of the shopping cart. The side frame members 16 and 16' merge into a common transverse front frame member 34, which is formed integral with the side frame members by bending the steel tubing.

The pair of rear tubular vertical frame members 18 and 18' also have lower rearwardly extending caster support extensions 35 and 35', which project rearwardly behind the rear tubular vertical frame members 18 and 18', respectively. A fixed caster assembly 12', having a construction well known in the art, is secured to each of these caster support extensions 35 and 35' and projects beyond a vertical axis 36 (see FIG. 2), which is disposed spaced rearwardly of the handle 13. A swiveling caster assembly 12" is secured at an intersection 37 of each of the side frame members 16 and 16' and a common transverse front frame 34. As can be seen from FIG. 3, the multi-compartments are disposed to carry a load in an area defined substantially inwardly between these casters 12.

It is also pointed out that the rear smaller compartment 24 is disposed adjacent to a rear wall 38 of the top basket compartment 24. The rear wall 38 has leg holes 39 formed therein whereby to receive the legs of a child (not shown) seated in the rear smaller baby seat compartment. The rear wall 38 is hinged at a top end 40 by bending and looping the vertical wire rods 41 thereover and as is also common in the art, whereby to provide for the rear wall to hinge upwardly for nesting the shopping carts 10 together.

The trough-like support shelf 29 is also disposed below the bottom wall 42 of the intermediate basket compartment 25. The intermediate basket compartment has a hinged rear wall 43, which also permits the nesting of the shopping cart and, while nesting, is pushed upwardly by the front end or front wall 44 of the intermediate basket compartment 25. This type of nesting is well known in the art.

Referring again to the rear smaller compartment 24, it is also formed as a collapsible compartment and is delineated by a displaceable separator wall 45, which also constitutes a backrest for the compartment when it is utilized as a baby seat compartment, and it is also hinged and collapsible to permit nesting.

The major advantage of this dedicated multi-compartment shopping cart is that, although it has a large cargo capacity due to its multi-compartments, it permits a user person to separate products from one another not to cause damage to the products which are more fragile. It also prevents odor contamination of products by scents released from other products when placed too close to one another. It also permits ease of placement of heavy products into the shopping cart. Another major feature is that, because the baskets are shallow and formed of wire rods, they provide easy visual access to the goods placed in these compartments by the user person. The load placed in these multi-compartments is also substantially disposed in the area between the support casters, making the shopping cart very stable. Its easy visual access also accelerates the time to process the purchased goods at a checkout counter. The multi-compartment shopping cart is also nestable and provides the conversion of one of the compartments to a baby seat compartment.

It is within the ambit of the present invention to cover any obvious modifications of the preferred embodiment described herein, provided such modifications fall within the scope of the appended claims.

What is claimed is:

1. A shopping cart with dedicated multi-compartments, said shopping cart comprising a tubular frame supported on casters, a handle disposed rearwardly in an upper section of said frame for displacing said shopping cart on a surface; said frame having a base portion having spaced-apart side frame members extending in a common plane with respect to a floor surface, and a rear portion upwardly extending from said spaced-apart side frame members; said rear portion defined by a rear tubular vertical frame member extending upwards from a rear section of an associated one of said spaced-apart side frame members, said handle being connected between a top free end of said rear tubular vertical frame members, and a structural stepped frame portion disposed forwardly of each rear tubular vertical frame member and defined by an L-shaped tubular member secured between a respective one of said spaced-apart side frame members and one of said rear tubular vertical frame members, said L-shaped tubular member having a top horizontal leg section and a depending vertical leg section, a free end of said vertical leg section being secured to an associated one of said rear tubular vertical frame members and spaced from said top free end thereof, said vertical leg section is secured at a lower end to one of said side frame members, a shallow top basket compartment secured across said horizontal leg sections and projecting forwardly thereof and adapted to receive light fragile merchandise therein, said shallow top basket compartment having a rear smaller compartment adapted to receive small fragile articles separated from said smaller top basket, a large shallow intermediate basket compartment secured to said vertical leg sections spaced under said shallow top basket compartment and having a major section thereof projecting forwardly of said shallow top basket compartment and adapted to receive non-fragile articles therein, a support platform across said spaced-apart frame members of said base portion accessible from under said large intermediate compartment adapted to receive large heavy articles, and a rear lower compartment accessible rearwardly of said shopping cart and having a through-like support shelf adapted to receive and retain articles not desirable to be close to foodstuff articles to separate them therefrom.

2. A shopping cart as claimed in claim 1 wherein said rear tubular vertical frame members and said vertical leg sections of said L-shaped structural tubular frame members are secured spaced apart in substantially parallel relationship, and a side wall member secured therebetween in at least a lower portion thereof.

3. A shopping cart as claimed in claim 2 wherein said trough-like support shelf is V-shaped in cross-section and defines a downwardly extending bottom wall depending inwardly from between said pair of rear tubular vertical frame members, and a forwardly upwardly sloped front wall disposed at substantially right angles thereto.

4. A shopping cart as claimed in claim 1 wherein said multi-compartments are comprised of said top basket compartment, said rear smaller compartment, said intermediate basket compartment, said support platform and said rear lower compartment, which are all constructed of spaced-apart wire rods whereby to provide visual access to merchandise in all said multi-compartments.

5. A shopping cart as claimed in claim 4 wherein said spaced-apart side frame members are angulated outwardly towards a rear of said shopping cart, said side frame members merging into a common transverse front frame member formed integral therewith.

6. A shopping cart as claimed in claim 1 wherein said pair of rear tubular vertical frame members have a lower rearwardly extending caster support flange extension projecting rearwardly behind said rear tubular vertical frame members, a caster secured to each said caster support flange extension and projecting beyond a vertical axis disposed spaced rearwardly of said handle, and a swiveling caster secured at an intersection of each said side frame member and said common transverse front frame, said multi-compartments being disposed to carry a load in an area defined substantially inwardly between said casters.

7. A shopping cart as claimed in claim 4 wherein said frame is constructed of hollow steel piping sections which are bent to desired configurations.

8. A shopping cart as claimed in claim 4 wherein said rear smaller compartment is disposed adjacent to a rear wall of said top basket compartment, said rear wall having leg holes therein whereby to receive the legs of a child seated in said rear smaller compartment, said rear wall being hinged at a top end thereof to provide nesting of said shopping cart with like ones of said shopping cart.

9. A shopping cart as claimed in claim 8 wherein said through-like support shelf is disposed below a bottom wall of said intermediate basket compartment, said intermediate basket compartment having a hinged rear wall to provide said nesting.

10. A shopping cart as claimed in claim 8 wherein said rear smaller compartment is a collapsible compartment and is delineated by a displaceable separator wall constituting a back rest for a baby seat compartment.

* * * * *